(No Model.)
C. F. MOLLY.
SAFETY ENVELOPE.
No. 526,112. Patented Sept. 18, 1894.
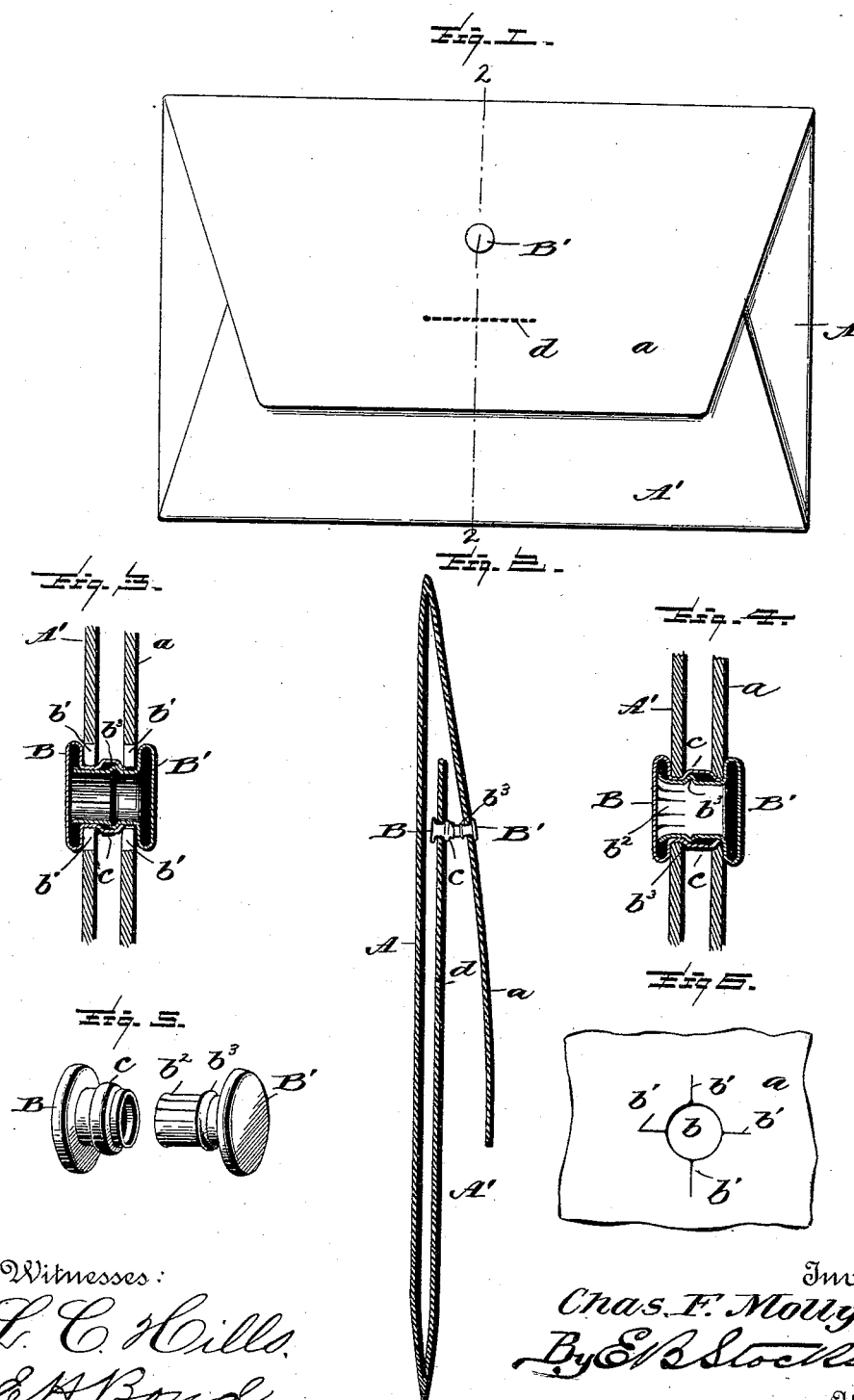

UNITED STATES PATENT OFFICE.

CHARLES F. MOLLY, OF PHILADELPHIA, PENNSYLVANIA.

SAFETY-ENVELOPE.

SPECIFICATION forming part of Letters Patent No. 526,112, dated September 18, 1894.

Application filed September 8, 1893. Serial No. 485,100. (No model.)

*To all whom it may concern:*

Be it known that I, CHARLES F. MOLLY, a citizen of the United States, residing at Philadelphia, in the county of Philadelphia, State of Pennsylvania, have invented certain new and useful Improvements in Safety-Envelopes, of which the following is a specification, reference being had therein to the accompanying drawings.

This invention relates to certain new and useful improvements in safety envelopes designed for the transportation of money or other valuables by mail or otherwise.

It has for its objects among others to provide a simple envelope having means for temporarily or permanently sealing the same. I provide a two-part sealing device or rivet, one part of which is held in the back of the envelope and the other part in the flap. The two parts are held in their respective portions of the envelope by slitting the latter and then inserting the rivet portion, the portions between the slits being forced out of their normal plane to prevent retrograde movement of the rivet portion. The one part is formed with a surrounding groove for the reception of an annular rib on the other portion. The end of the male portion of the rivet is slit to form spring portions so that when it is desired to permanently seal the envelope the two parts can be pressed together sufficiently to spread the split portions sufficiently to prevent separation of the two parts of the rivet and consequently prevent opening of the envelope. I sometimes provide a slit perforation or opening in the back of the envelope through which a piece of metal or some suitable implement may be inserted and upon which the inner end of the rivet may rest when pressure is brought to bear thereon for permanently sealing or closing the envelope. This slit is covered by the flap of the envelope when it is stuck down.

Other objects and advantages of the invention will hereinafter appear and the novel features thereof will be specifically defined by the appended claims.

The invention is clearly illustrated in the accompanying drawings, which, with the letters of reference marked thereon, form a part of this specification, and in which—

Figure 1 is a rear view of one of my improved envelopes with the flap sealed. Fig. 2 is a section taken through the line 2—2 of Fig. 1. Fig. 3 is an enlarged section through the rivet showing the position they assume when the parts are but temporarily engaged. Fig. 4 is a like view with the parts permanently locked. Fig. 5 is an enlarged perspective view of the two parts of the rivet separated. Fig. 6 is a detail of a portion of the envelope showing the hole with its slits for the reception of a part of the rivet.

Like letters of reference indicate like parts throughout the several views.

Referring now to the details of the drawings by letter, A designates an envelope which may be of any form and style except as hereinafter set forth.

A′ is the back portion and $a$ the flap.

B designates one part of the rivet or fastening device, and B′ the other part. These parts are held the one in the back and the other in the flap of the envelope, preferably in the following manner: The part in which the portion of the rivet is to be held is provided with a hole $b$ as seen in Fig. 6 which is of slightly less diameter than that of the portion of the rivet to be held therein, and from this opening extend a plurality of slits $b′$ as shown in Fig. 6. As the rivet portion is forced through said opening the portions of the envelope between the slits spread to allow of the passage of the rivet portion, and then assume substantially their normal position and engage against the inner face of the head of the rivet portion in such a manner as to resist considerable strain or pressure in a direction which would tend to remove the rivet portion. I have found that such construction serves to hold the rivet portion in place under any and all conditions or positions that the envelope is called upon to assume under ordinary circumstances. Additional precautions may be taken if desired.

Each of the two parts of the rivet is preferably provided with a cap or head as shown so that no opening will be left through which or by which access may be had to the interior of the envelope. The part B′ has its inner end slitted to form spring portions $b^2$ as seen in Fig. 5 and between its cap or head and the other end it is provided with an annular rib or flange $b^3$ as seen in Figs. 2, 3, 4 and 5. The part B has an annular enlargement or groove c as seen in Figs. 3, 4 and 5 for the reception of the rib $b^3$ on the part B'. The groove in the part B is of somewhat greater dimensions in the direction of the width of the groove than that of the rib on the part B' so that when the parts are brought together the rib will have some movement in the groove as will be seen from Figs. 3 and 4. This is provided for the purpose of allowing the parts to be so connected that they may be separated by sufficient force being applied to draw them apart, the part B' being forced into the part B only sufficiently to permit the rib thereon to enter the groove in the part B as seen in Fig. 3, but when it is desired to close the envelope permanently sufficient force is exerted to force the part B' way into the part B till the rib on the part B' strikes the opposite side of the groove as seen in Fig. 4 and the split end of the part B' is forced outward by reason of the engagement of the split portions thereof with the inner face of the cap of the part B as seen in said Fig. 4 and thus forming a permanent lock and preventing separation of the two parts of the rivet.

In order that the two parts may be forced together with considerable force without defacing the front of the envelope I provide in the back at a point where it will be concealed by the flap when the latter is stuck down, a slit (or it may be a perforation) $d$ through which a knife or a piece of metal or any suitable implement may be placed and held against the head of the part B while the parts are being pressed together.

Modifications in detail may be resorted to without departing from the spirit of the invention or sacrificing any of its advantages.

What I claim as new is—

1. An envelope fastening device consisting of one portion with a head and a split end and an annular rib between its ends, and another portion with a head and an annular groove of greater width than that of the rib, substantially as and for the purpose specified.

2. An envelope provided in its back and in the surface thereof included above the gum-line of the flap with one member of a fastening device having a hollow head and tubular shank and with an adjacent slit also above the gum-line of the closing flap and having in said closing flap another member of the fastening device having a head and a tubular slitted shank, substantially as specified.

In testimony whereof I affix my signature in presence of two witnesses.

CHARLES F. MOLLY.

Witnesses:
JNO. H. KRESSLER,
F. L. FACKENTHAL.